(12) United States Patent
Robertson

(10) Patent No.: US 7,819,456 B2
(45) Date of Patent: Oct. 26, 2010

(54) INSTRUMENT PANEL COVERS WITH LOCKOUT RIBS

(75) Inventor: Winston Robertson, Richmond (AU)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 317 days.

(21) Appl. No.: 11/971,288

(22) Filed: Jan. 9, 2008

(65) Prior Publication Data
US 2009/0174213 A1 Jul. 9, 2009

(51) Int. Cl.
B62D 25/14 (2006.01)

(52) U.S. Cl. ..................... 296/70; 280/728.3

(58) Field of Classification Search .......... 296/70; 248/27.1; 174/135, 50; 385/139, 53; 180/90; 310/85, 89; 439/535; 280/752, 728.2, 728.3, 280/732
See application file for complete search history.

(56) References Cited

U.S. PATENT DOCUMENTS

| | | | |
|---|---|---|---|
| 4,281,224 A | | 7/1981 | Castagna |
| 4,286,835 A | * | 9/1981 | Adams et al. ............. 439/395 |
| 4,359,133 A | * | 11/1982 | Krolak ..................... 181/172 |
| 4,439,643 A | * | 3/1984 | Schweizer ................. 381/395 |
| 4,479,173 A | * | 10/1984 | Rumpakis .................. 362/294 |
| 4,555,158 A | * | 11/1985 | Lam .......................... 439/404 |
| 4,852,178 A | * | 7/1989 | Inkman et al. ............. 381/395 |
| 4,977,482 A | * | 12/1990 | Langdon et al. ........... 361/661 |
| 5,036,441 A | * | 7/1991 | Herron ...................... 362/95 |
| 5,316,335 A | * | 5/1994 | Gray et al. ................ 280/728.3 |
| 5,342,090 A | * | 8/1994 | Sobczak et al. ........... 280/732 |
| 5,354,094 A | * | 10/1994 | Matano et al. ........... 280/728.3 |
| 5,396,861 A | * | 3/1995 | Acker et al. ............... 114/361 |
| 5,411,310 A | * | 5/1995 | Viertel et al. ............. 296/97.9 |
| 5,416,283 A | * | 5/1995 | Dault et al. ............... 181/150 |
| 5,527,064 A | * | 6/1996 | Kai et al. .................. 280/728.2 |
| 5,532,437 A | * | 7/1996 | Simplicean et al. ........ 181/150 |
| 5,565,659 A | * | 10/1996 | Moner et al. .............. 181/150 |
| 5,639,140 A | * | 6/1997 | Labrash .................... 296/39.1 |
| 5,652,413 A | * | 7/1997 | Mulera ...................... 181/141 |
| 5,848,855 A | * | 12/1998 | Roossien .................. 403/329 |
| 6,061,460 A | * | 5/2000 | Seo ............................ 381/388 |
| 6,350,151 B1 | * | 2/2002 | Elliot et al. ................ 439/535 |
| 6,394,486 B1 | * | 5/2002 | Fujimura et al. .......... 280/728.2 |
| 6,427,019 B1 | * | 7/2002 | Ketterer et al. ........... 381/386 |
| 6,456,722 B1 | | 9/2002 | Davey et al. |
| 6,672,650 B2 | * | 1/2004 | Winget ..................... 296/146.7 |
| 6,675,930 B2 | * | 1/2004 | Sugiyama et al. .......... 181/148 |
| 6,688,919 B2 | * | 2/2004 | Sumer et al. .............. 439/718 |
| 6,783,231 B1 | * | 8/2004 | Kim .......................... 347/108 |
| 6,843,669 B2 | * | 1/2005 | Drane et al. ............... 439/142 |
| 6,881,901 B2 | * | 4/2005 | Egan ......................... 174/665 |
| 7,221,772 B2 | * | 5/2007 | Evenisse et al. ........... 381/386 |
| 7,331,420 B2 | * | 2/2008 | Sasaki et al. .............. 181/148 |
| 7,346,181 B2 | * | 3/2008 | Rivera ....................... 381/391 |
| 7,527,286 B2 | * | 5/2009 | Beckley et al. ............ 280/728.3 |
| 7,695,001 B2 | * | 4/2010 | Adler et al. ............... 280/728.3 |
| 2004/0162513 A1 | * | 8/2004 | Neri et al. .................. 604/6.09 |
| 2007/0098204 A1 | * | 5/2007 | Iekura ....................... 381/386 |

* cited by examiner

Primary Examiner—Kiran B. Patel
(74) Attorney, Agent, or Firm—Dinsmore & Shohl LLP

(57) ABSTRACT

A cover for use in an opening of a vehicle instrument panel. The cover may include a top surface, an underside and one or more clips for securing the cover in an opening of the vehicle instrument panel. The cover may also include one or more lock-out ribs extending from the underside of the cover. The lock-out ribs prevent the cover from being improperly installed in an instrument panel opening where an accessory is present.

20 Claims, 5 Drawing Sheets

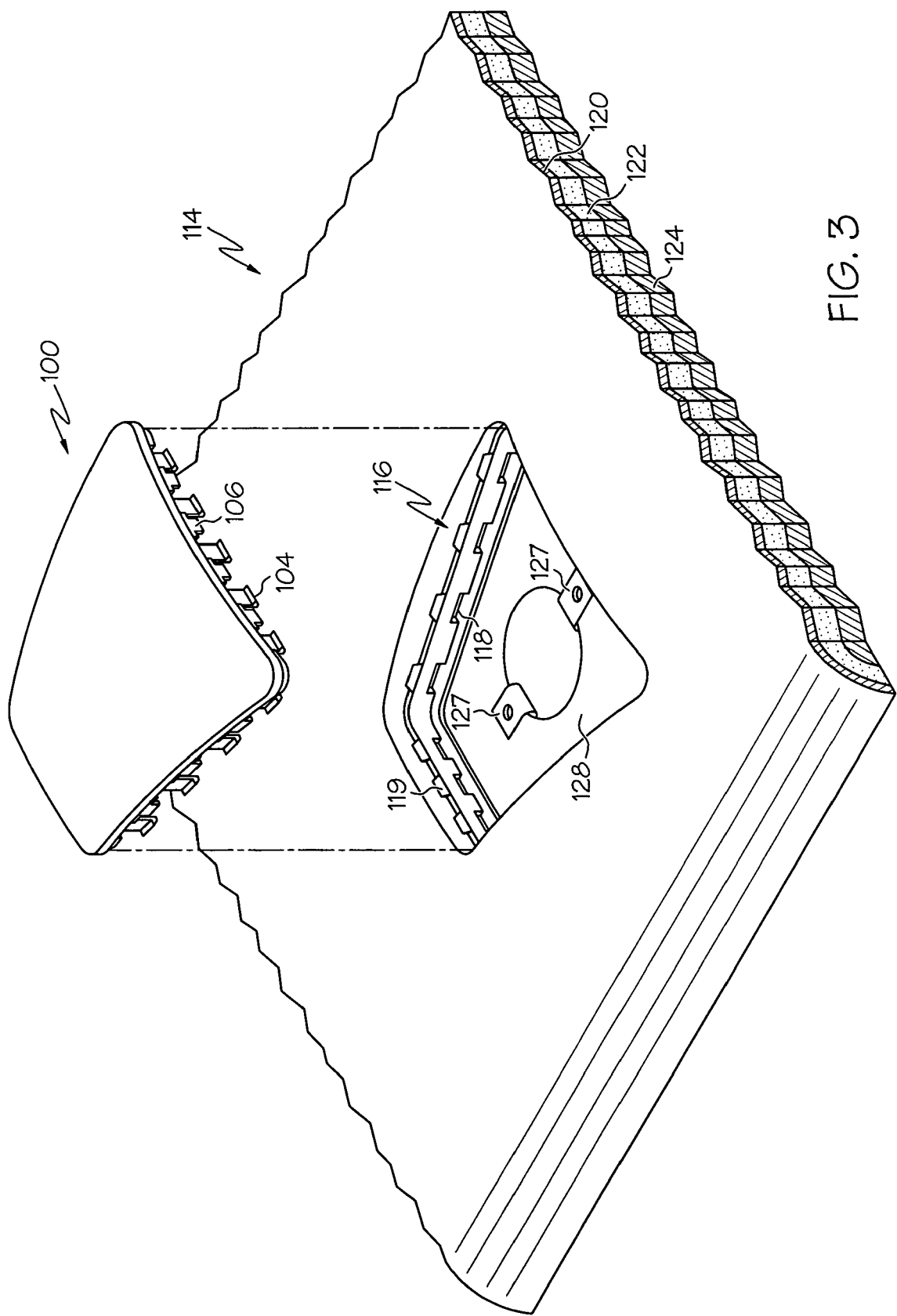

INSTRUMENT PANEL COVERS WITH LOCKOUT RIBS

TECHNICAL FIELD OF THE INVENTION

The present invention generally relates to instrument panels and, more specifically, to instrument panel covers having lockout ribs.

BACKGROUND OF THE INVENTION

Instrument panels for vehicles are generally configured with a variety of openings that accommodate different finish options and accessories that may be selected by the consumer. An accessory may be installed in an opening of the instrument panel and a decorative bezel, accessory panel or accessory cover inserted in the opening to obscure the accessory attachment points and provide a transition between the surface of the instrument panel and the accessory. When a vehicle is assembled without one of these accessories, thus leaving an open hole in the instrument panel, a solid panel or cover may be installed in the instrument panel opening to obscure the opening where the accessory could have been installed and provide the instrument panel with a more finished and uniform appearance. In certain situations, such as when the accessory is recessed in the opening of the instrument panel, it may be possible to inadvertently install a solid panel or cover in an instrument panel opening where a decorative bezel, accessory panel or accessory cover should have been installed. For example, when a speaker is installed in an instrument panel the speaker may be positioned such that a cover may be inadvertently and improperly installed over the top of the speaker instead of the functional accessory cover, in this example a speaker cover. Under such conditions, the speaker may not function properly due to the improperly installed cover.

Accordingly, the need exists for cover for an opening in a vehicle instrument panel that would prevent the cover from being improperly installed in an instrument panel opening where an accessory is present.

SUMMARY OF THE INVENTION

The present invention may include a cover for a vehicle instrument panel. The cover may include a top surface, an underside and at least one lock-out rib. The at least one lock-out rib extends from the underside of the cover such that, when the cover is positioned in the opening of the vehicle instrument panel and the opening contains an accessory, the at least one lock-out rib contacts the accessory and prevents the cover from being seated in the opening thereby preventing the cover from being improperly installed in the opening.

In another embodiment, the present invention may include a cover for an opening in a vehicle instrument panel. The cover may include a top surface, an underside and a plurality of clips configured to engage with recessed slots in the opening of the vehicle instrument panel. The clips may extend from the underside of the cover. The cover may also include at least one lock-out rib extending from the underside of the cover. When the cover is positioned in the opening of the vehicle instrument panel and the opening contains an accessory, the at least one lock-out rib may contact the accessory and prevent the cover from being seated in the opening. Because the cover is not seated in the opening, the clips located on the underside of the cover do not engage the recessed slots in the opening of the vehicle instrument panel. Accordingly, the at least one lock-out rib prevents the cover from being improperly installed in an opening of a vehicle instrument panel containing an accessory.

In another embodiment, the present invention may include a method of preventing a cover from being improperly installed in an opening of a vehicle instrument panel containing an accessory. The method may include providing a vehicle instrument panel and a cover. The vehicle instrument panel may include at least one opening for receiving an accessory. The cover may include a top surface, an underside and at least one lock-out rib extending from the underside of the cover. The cover may be positioned in the opening of the vehicle instrument panel such that the clips on the underside of the cover are aligned with the recessed slots located in the opening. A force may be exerted on the cover to seat the instrument panel in the opening. However, if an accessory is present in the opening, the at least one lock-out rib located on the underside of the cover may contact the accessory and prevent the cover from being seated in the opening thereby preventing the cover from being improperly installed in the opening of the vehicle instrument panel.

BRIEF DESCRIPTION OF THE DRAWINGS

The following description of the specific illustrative embodiments of the present invention can be read in conjunction with the following drawings in which:

FIG. 3 is a perspective view of a cover for a vehicle instrument panel in accordance with one embodiment of the present invention positioned proximate an opening in a vehicle instrument panel;

DETAILED DESCRIPTION OF THE ILLUSTRATIVE EMBODIMENTS

Figure 1A:
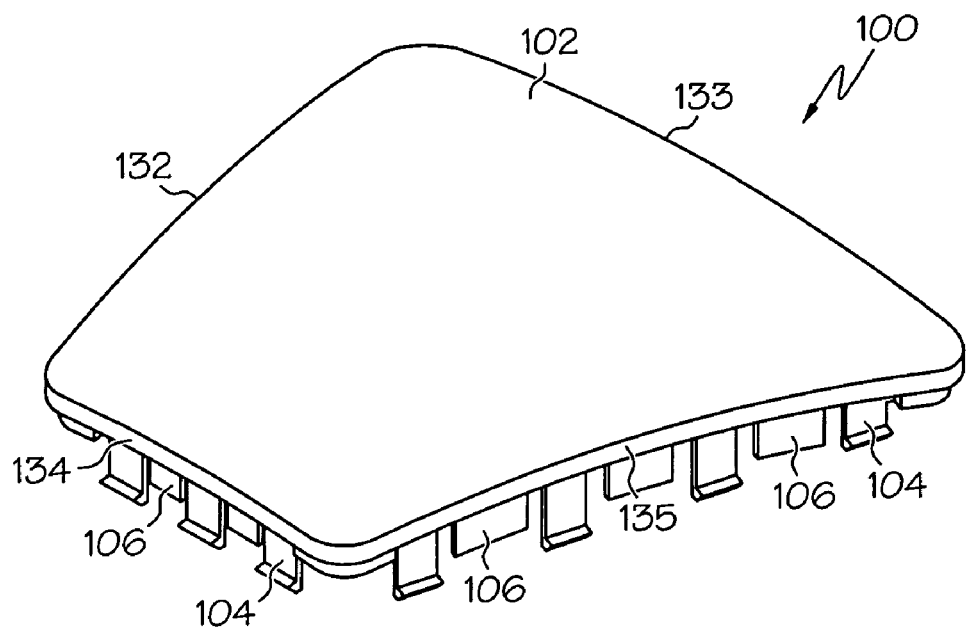
FIG. 1A depicts a top perspective view of a cover for a vehicle instrument panel in accordance with one embodiment shown and described herein.
Figure 1B:
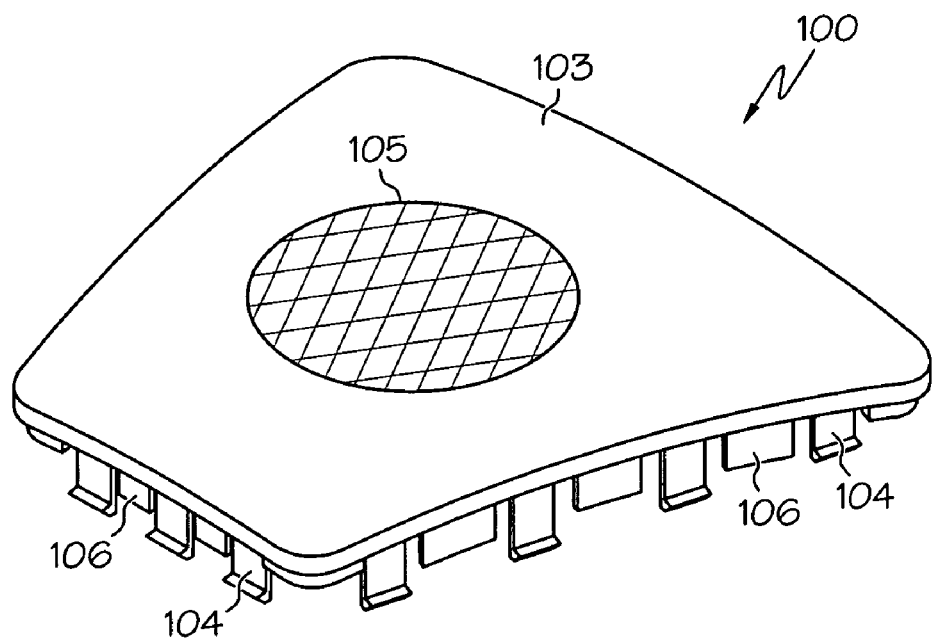
FIG. 1B depicts a top perspective view of a cover for a vehicle instrument panel in accordance with another exemplary embodiment of the present invention.

FIG. 1A shows a cover for an opening in a vehicle instrument panel in accordance with one embodiment of the present invention. As described herein, the cover of the present invention comprises features which prevent the cover from being installed in an opening in a vehicle instrument panel when an accessory is positioned in the opening. The cover may generally comprise a top surface, an underside and one or more lock-out ribs extending from the underside. Each of these elements will be described more fully herein.

It should be understood that the phrase "cover," as used herein, means a cover or panel intended for installation in an opening of a vehicle instrument panel when there is no accessory present in the opening. It should also be understood that the phrase "accessory cover," as used herein, means a cover or panel intended for installation in an opening of an instrument panel where an accessory is present in the opening.

Referring now to FIGS. 1A-3, a cover 100 for an opening 116 in a vehicle instrument panel 114 is shown. The cover 100 may comprise metal, composite, and/or polymeric materials. In the embodiments shown and described herein, the cover 100 is formed by injection molding a polymeric material such as polypropylene or acylonitrile butadiene styrene. However, other materials and forming processes may be used to form the cover 100 as will be apparent to one of ordinary skill in the art.

The cover 100 may comprise a top surface 102 and an underside 107. The cover 100 is generally shaped to correspond to the geometry of the opening 116 in a vehicle instrument panel 114 for which the cover 100 is intended to be installed. In the embodiment shown in FIGS. 1A, 2A and 3, the top surface 102 and underside 107 may be bound by edges 132, 133, 134, 135 such that the cover 100 is generally polygonal in shape. However, it should be understood that, while the embodiment of the cover 100 shown in FIGS. 1-6 is depicted as a four sided polygon, the cover 100 of the present invention is not limited to any particular geometrical configuration and may be of any suitable geometry as may be defined by a single edge, such as a circle or oval, or multiple edges such as any regular or irregular polygon.

The top surface 102 of the cover 100 may comprise a generally smooth finish or a grained finish. In one embodiment, as shown in FIG. 1B and FIGS. 4-6, at least a portion of the top surface 103 may comprise a grid pattern 105. The grid pattern 105 may be integrally formed with the cover 100 thereby providing the cover 100 with a grill-like appearance such as may be found on an accessory cover for a speaker. However, the grid pattern 105 may or may not have openings extending from the top surface 102 to the underside 107 such as may be found in a functional accessory cover for a speaker.

The underside 107 of the cover 100 may comprise a plurality of clips 104 and stand-off ribs 106 to facilitate securing the cover 100 in an opening 116 of a vehicle instrument panel 114, as will be discussed further herein. The clips 104 and stand off ribs 106 may be integrally formed with the cover 100, such as when the cover 100 is injection molded, or the clips 104 may be attached to the cover 100 after the cover 100 has been formed. In the embodiments discussed and described herein, the clips 104 and standoff ribs 106 are integrally formed with the cover 100. The clips 104 and standoff ribs 106 may be positioned proximate the edges 132, 133, 134, 135 and extend outward, away from and generally orthogonal to the underside 107 of the cover 100. The clips 104 may have a J-shaped configuration for engaging with a corresponding recessed slot 118 located in the opening 116 of the vehicle instrument panel 114. The standoff ribs 106 may have a regular geometrical configuration such as a rectangular or cylindrical post and serve as a support for the cover 100, as will be discussed in more detail herein. As shown in FIGS. 1A-2C, the standoff ribs 106 have a thin, rectangular configuration.

It should be understood that, while the clips 104 shown in FIGS. 1A-3 have a generally J-shaped configuration, the clips 104 may be of any suitable configuration for attaching the cover 100 to a vehicle instrument panel 114 as may be apparent to one skilled in the art. Furthermore, it will also be apparent to one skilled in the art that, while the present invention recites the use of clips 104 to secure the cover 100 in an opening 116 in a vehicle instrument panel 114, other fasteners may be used to secure the cover 100 in the opening 116. For example, screws, bolts, fin-type clips and the like may be used to secure the cover 100 in the opening 116.

Figure 2A:
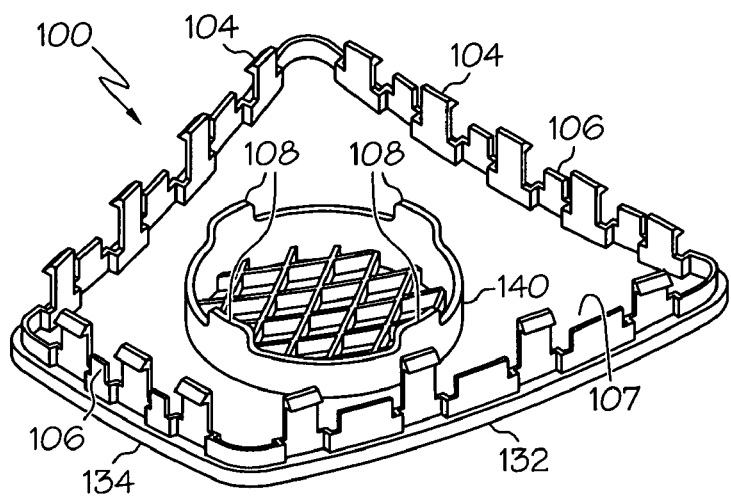
FIG. 2A depicts a perspective view of the underside of a cover for a vehicle instrument panel in accordance with one exemplary embodiment of the present invention.

As shown in FIG. 2A, the underside 107 of the cover 100 may also contain at least one lock-out rib 108 extending from the underside 107 of the cover 100 to prevent the cover 100 from being installed in an opening 116 of a vehicle instrument panel 114 in which an accessory, such as an audio speaker, is installed. In the embodiment shown in FIG. 2A, the cover 100 has four lock-out ribs 108 extending from an annulus 140 positioned on the underside 107 of the cover 100. The lock-out ribs 108 and annulus 140 may be integrally formed with the cover 100, such as when the cover 100, the lock-out ribs 108, and annulus 140 are injection molded as a single piece. Alternatively, the lock-out ribs and/or annulus may be attached to the cover 100 after the cover 100 has been formed. The lock-out ribs 108 are generally positioned such that they may contact an accessory located in an opening 116 of vehicle instrument panel 114 without damaging the accessory. To facilitate contact with the accessory, the lock-out ribs 108 may have a post-like configuration extending from and generally orthogonal to the underside 107 of the cover 100. While the lock-out ribs 108 are depicted as having a thin, rectangular configuration, as shown in FIG. 2A, the lock-out ribs 108 may be of any suitable geometrical configuration as will be apparent to one of skill in the art. The lock-out ribs 108 may be of sufficient length in the direction extending away from the underside 107 of the cover 100 such that the lock-out ribs 108 may contact an accessory positioned in the opening 116 of a vehicle instrument panel 114 thereby preventing the improper installation of the cover 100 over top of the accessory.

Figure 2B:
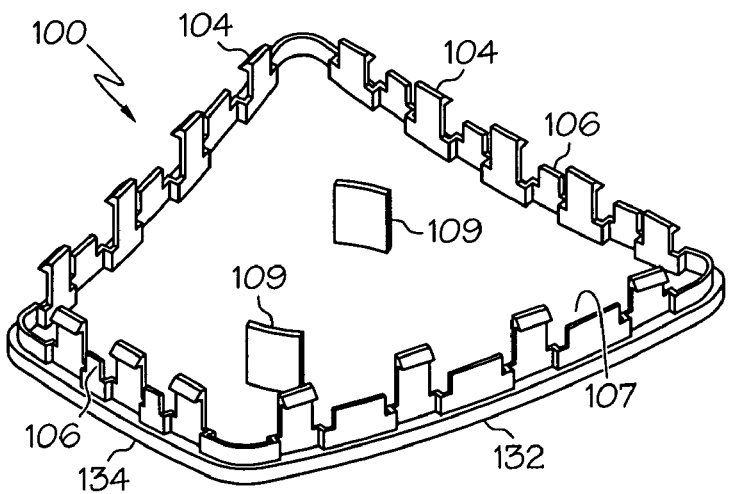
FIG. 2B depicts a perspective view of the underside of a cover for a vehicle instrument panel in accordance with another exemplary embodiment of the present invention.

In another embodiment, the cover 100 may comprise a two lock-out ribs 109 extending from the underside 107 of the cover 100, as is shown in FIG. 2B. The lock-out ribs 109 may generally be positioned on the underside of the cover 100 and have an orientation suitable for contacting an accessory which may be positioned in the opening 116 of a vehicle instrument panel 114 in which the cover 100 may be installed. In the embodiment shown in FIG. 2B, the lock-out ribs 109 are configured to engage an accessory having a generally rectangular shape, such as a video or audio accessory located in an opening 116 of the vehicle instrument panel 114. The lock-out ribs 109 extend from the underside of the cover 100 a distance sufficient to prevent the cover from being improperly installed in the opening 116 where the accessory is present.

Figure 2C:
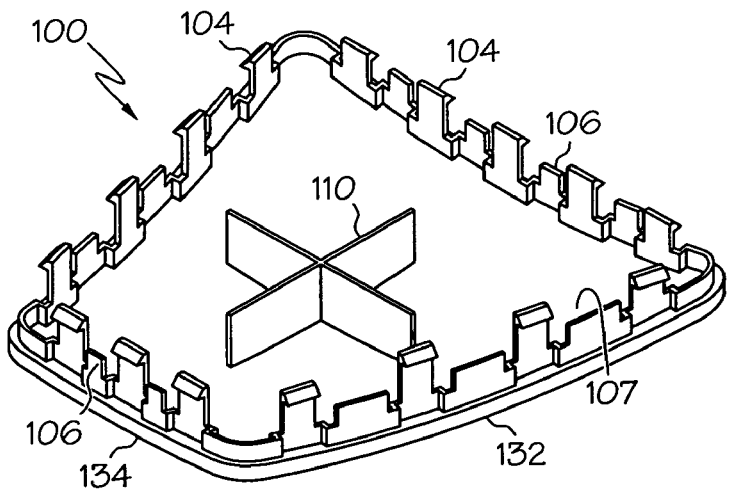
FIG. 2C depicts a perspective view of the underside of a cover for a vehicle instrument panel in accordance with another exemplary embodiment of the present invention.

In another embodiment, the cover 100 may comprise multiple lock-out ribs 110 oriented in a crossed configuration as shown in FIG. 2C. The lock-out ribs 110 may generally be positioned in the center of the underside 107 of the cover 100 and have an orientation suitable for contacting an accessory which may be positioned in the opening 116 of a vehicle instrument panel 114 in which the cover 100 may be installed. In the embodiment shown in FIG. 2C, the lock-out ribs 110 are configured to engage an accessory such as an HVAC duct or other accessory module located in the opening. The lock-out ribs 110 extend from the underside of the cover 100 a distance sufficient to prevent the cover 100 from being improperly installed in the opening 116 where an accessory is present.

It should now be understood that the cover 100 may have at least one lock-out rib 108 extending from the underside of the cover 100 a distance sufficient to contact an accessory positioned in an opening 116 of a vehicle instrument panel 114 in which the cover 100 is to be installed thus preventing the cover 100 from being improperly installed in the opening. The location, position and number of the lock-out ribs may vary depending on the configuration of the opening 116 and the type of accessory which the opening 116 was configured to receive. For example, as shown in FIG. 2A, when the opening 116 is configured to receive an audio speaker, multiple lock-out ribs 108 may be positioned to contact the outer edge of the audio speaker so as not to damage the audio speaker. Instrument panel openings 116 configured to receive different accessories may thus necessitate covers 100 having differently configured lock-out ribs extending from the underside 107 of the cover 100 to prevent improper installation of the cover 100.

As shown in FIG. 3, the cover 100 of the present invention is for use in conjunction with an opening 116 in a vehicle instrument panel 114. The vehicle instrument panel 114 may comprise an opening 116 for receiving an accessory. The vehicle instrument panel 114 may comprise a "soft" instrument panel comprising an instrument panel substrate 124 covered by foam 122 and a skin material 120, as shown in FIG. 3. In another embodiment (not shown), the vehicle instrument panel 114 may comprise a "hard" or solid instrument panel made of a polymeric material.

Still referring to FIG. 3, the opening 116 in the vehicle instrument panel 114 may include supports 128 and attachment points 127 for supporting and attaching an accessory in the opening 116. The opening 116 may also be formed with a standoff shelf 126 and a plurality of recessed slots 118 for engaging with the clips 104 located on the underside of the cover 100. As will be discussed further herein, the standoff shelf 126 may provide a horizontal datum on which the standoff ribs 106 rest. The recessed slots 118 may be located around the perimeter of the opening 116 and positioned to receive a correspondingly positioned clip 104 located on the underside 107 of the cover 100. Each recessed slot 118 may be positioned proximate a wedge 119 such that the clip 104 must pass over the wedge 119 before engaging with the recessed slot 118. The wedges 119 assist in the engagement of the clip 104 with the recessed slot 118 and provide lateral support to the clips 104 which, in turn, improves the overall fit of the cover 100 in the opening 116. It should be understood that, while FIG. 3 depicts the opening 116 as containing recessed slots 118 for engaging with the clips 104 located on the underside 107 of the cover 100, any suitable combination of fastener and corresponding connector may be used to secure the cover 100 in the opening 116 as will be apparent to one skilled in the art. This may include, without limitation, screws and corresponding screw holes, bolts and corresponding bolt holes, fin-type clips and corresponding holes, and the like.

Figure 4:
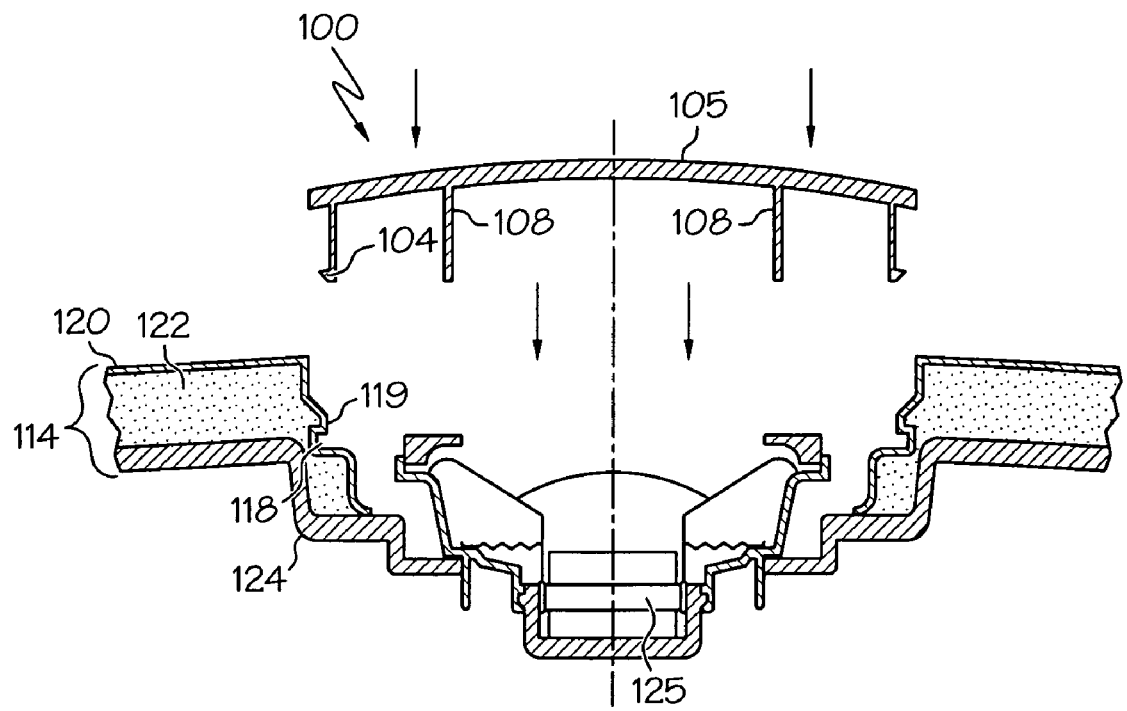
FIG. 4 is a cross-sectional view of a cover for a vehicle instrument panel in accordance with one exemplary embodiment of the present invention positioned for installation in an opening of a vehicle instrument panel.
Figure 5:
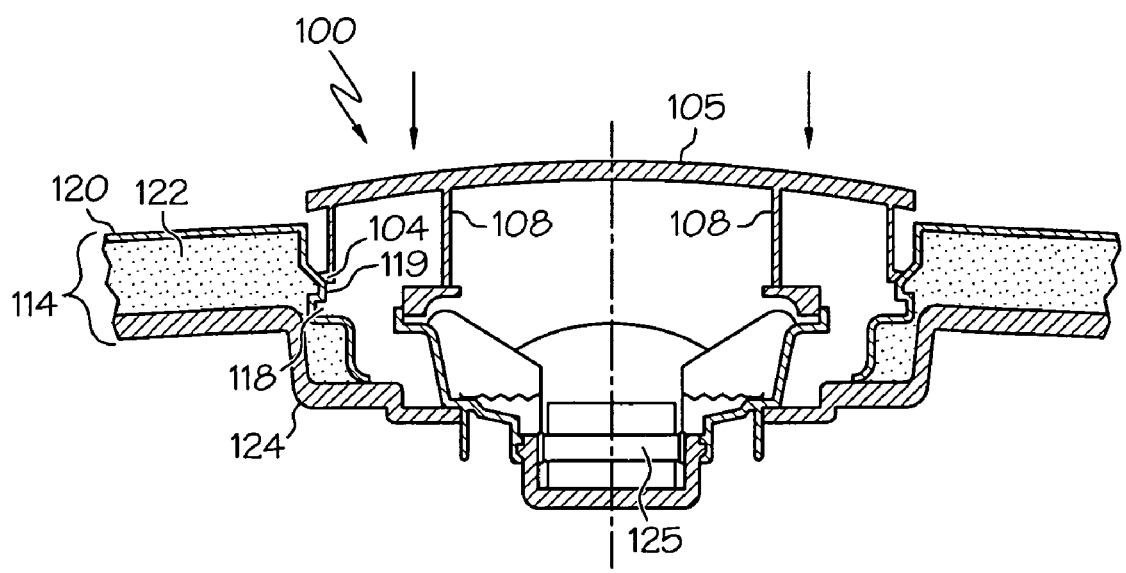
FIG. 5 is a cross-sectional view of a cover for a vehicle instrument panel in accordance with one exemplary embodiment of the present invention being installed in an opening of a vehicle instrument panel where an accessory is located.

Referring now to FIGS. 4-5, a cover 100 in accordance with one embodiment of the present invention is shown being installed in an opening 116 in an instrument panel 114. The opening 116 contains an accessory 125, specifically an audio speaker. The audio speaker is normally covered with a specifically configured accessory cover, such as a speaker cover with a functioning grill, instead of the cover 100 as shown in FIG. 4. Accordingly, in this example, the cover 100 is not the proper cover for installation in the opening 116.

In use, the cover 100 may be first positioned relative to the opening 116 in the vehicle instrument panel 114 such that the clips 104 are aligned with the recessed slots 118 located in the opening 116. When a force is applied to the cover 100 to install the cover 100 in the opening 116, the lock-out ribs 108 contact the accessory 125 and prevent the cover 100 from being fully seated in the opening 116, as shown in FIG. 5. Because the cover 100 is not fully seated in the opening 116, the connectors 104 cannot engage with the recessed slots 118 located in the opening 116 of the vehicle instrument panel 114. As such, the interaction of the lock-out ribs 108 with the accessory 125 prevent the cover 100 from being improperly installed in the opening 116 in place of the proper accessory cover, specifically a speaker cover having a functioning grill.

Figure 6:
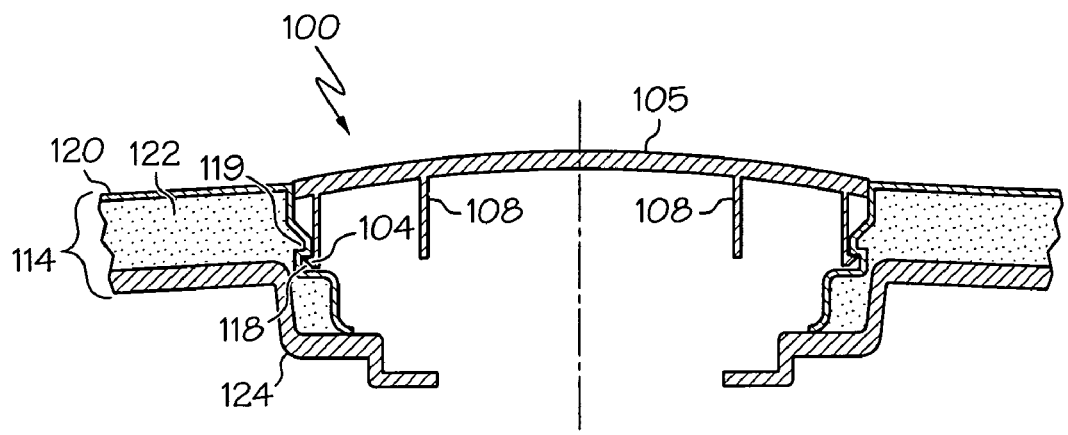
FIG. 6 is a cross sectional view of a cover for a vehicle instrument panel in accordance with one exemplary embodiment of the present invention installed in an opening in a vehicle instrument panel.
Figure 7:
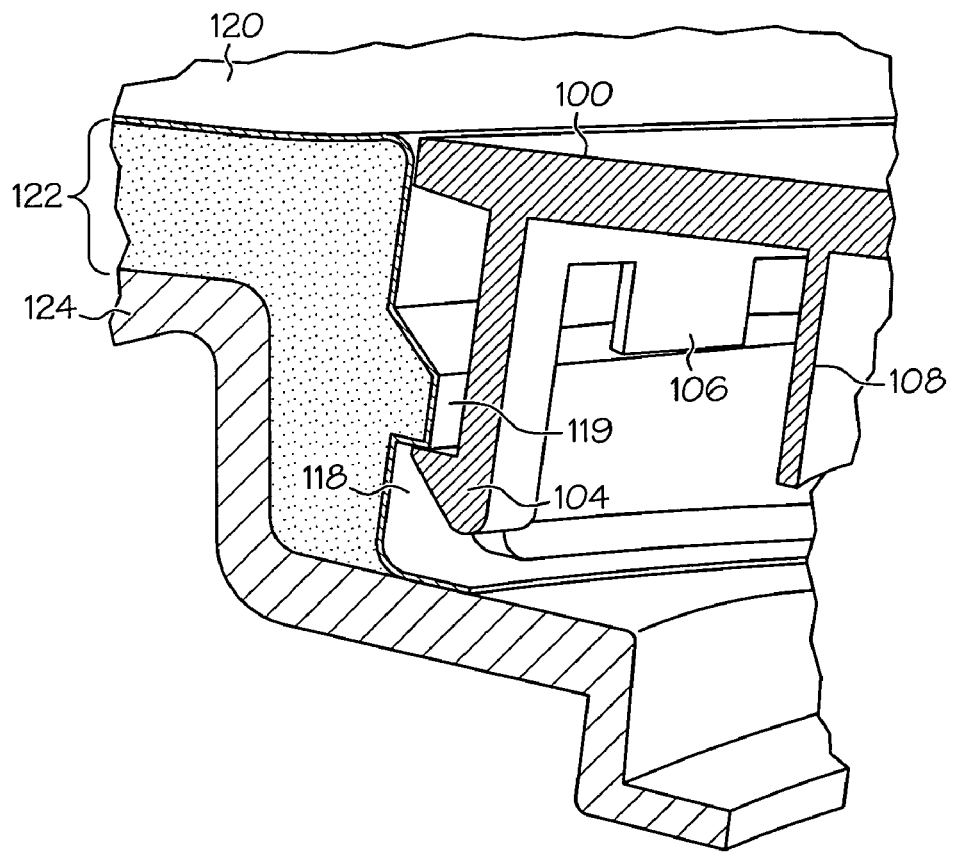
FIG. 7 is a cross sectional view of a clip and standoff rib of a cover for a vehicle instrument panel in accordance with one exemplary embodiment of the present invention.

Referring now to FIGS. 6 and 7, by way of contrast, a cover 100 in accordance with one embodiment of the present invention is shown installed in an opening 116 in a vehicle instrument panel 114. In this example an accessory is not present in the opening 116 of the vehicle instrument panel 114. As such, the cover 100 may be fully seated in the opening 116 such that the clips 104 are engaged with the recessed slots 118 located in the opening 116. Further, as shown in FIG. 7, when the clips 104 are engaged with the recessed slots 118 in the opening 116, the clips 118 act as a horizontal datum and prevent the cover 100 from being withdrawn from the opening 116. Similarly, when the cover 100 is fully seated in the opening 116, the standoff ribs 106 on the underside 107 of the cover 100 rest on the standoff shelf 126. In this position, the standoff ribs 106 act as a horizontal datum and keep the cover 116 from being inserted further into the opening 116. Accordingly, the combination of the clips 104 and the standoff ribs 106 maintain the position of the cover 100 in the opening 116 when the cover 100 is properly seated in the opening 116 and prevent the cover 100 from being withdrawn or inserted further into the opening 116.

It should now be understood that the cover according to the present invention may be used in conjunction with an opening in a vehicle instrument panel. When an accessory is present in the opening, the lock-out ribs on the underside of the cover prevent the cover from being improperly installed over top of the accessory. When an accessory is not present in the opening, the cover may be installed in the opening thereby obscuring the opening and providing the vehicle instrument panel with a more finished appearance.

While specific examples discussed herein make reference to an opening in a vehicle instrument panel configured to receive a speaker, it will be understood that the cover of the present invention may be used in conjunction with openings in a vehicle instrument panel configured to receive any type of accessory including, without limitation, audio and video accessories, HVAC accessories, meters, gages, and the like. Moreover, it should be understood that the covers of the present invention are not limited to vehicle instrument panels and that such covers and methods may also be used in conjunction with other finish panels such as vehicle trim panels, appliance finish panels and the like.

While particular embodiments and aspects of the present invention have been illustrated and described herein, various other changes and modifications can be made without departing from the spirit and scope of the invention. Moreover, although various inventive aspects have been described, such aspects need not be utilized in combination. It is therefore intended that the appended claims cover all such changes and modifications that are within the scope of this invention.

What is claimed is:

1. A cover for an instrument panel of a vehicle comprising:
   a top surface, an underside and at least one lock-out rib, wherein the at least one lock-out rib extends from and the underside of the cover; and
   wherein, when the cover is positioned in an opening of a vehicle instrument panel and the opening contains an accessory, the at least one lock-out rib contacts the accessory and prevents the cover from being seated in the opening thereby preventing the cover from being improperly installed in the opening.

2. The cover of claim 1 further comprising a plurality of connectors configured to engage with corresponding connectors located in the opening of the instrument panel, wherein the plurality of connectors extend substantially orthogonally from the underside of the cover; and
   wherein, when the cover is positioned in the opening of the vehicle instrument panel and the opening comprises an accessory, the at least one lock-out rib contacts the accessory and prevents the plurality of connectors from engaging with the corresponding connectors located in the opening of the vehicle instrument panel.

3. The cover of claim 2 wherein, when the connectors of the cover are engaged with the corresponding connectors located in the opening of the vehicle instrument panel, the connectors provide a horizontal datum preventing the cover from being withdrawn from the opening.

4. The cover of claim 2 wherein the cover further comprises a plurality of standoff ribs extending substantially orthogonally from the underside of the cover, wherein the standoff ribs are configured to rest on a standoff shelf positioned in the opening of the vehicle instrument panel such that, when the cover is properly seated in the opening of the vehicle instrument panel, the standoff ribs resting on the standoff shelf provide a horizontal datum preventing the cover from being further inserted into the opening.

5. The cover of claim 2 wherein the at least one lock-out rib and the plurality of clips are integral with the cover.

6. The cover of claim 1 wherein the cover and the at least one lock-out rib comprise a polymeric material and are injection molded as a single piece.

7. The cover of claim 1 wherein at least a portion of the top surface comprises a grid pattern.

8. A cover for an opening in a vehicle instrument panel comprising:
   a top surface, an underside and a plurality of connectors configured to engage with corresponding connectors in an opening of a vehicle instrument panel, wherein the connectors extend substantially orthogonally from the underside of the cover; and
   at least one lock-out rib, wherein the at least one lock-out rib extends from the underside of the cover such that, when the cover is positioned in the opening of the vehicle instrument panel and the opening contains an accessory, the at least one lock-out rib contacts the accessory and prevents the cover from being seated in the opening and the connectors of the cover from engaging with the corresponding connectors in the opening, thereby preventing the cover from being improperly installed in the opening.

9. The cover of claim 8 wherein, when the connectors of the cover are engaged with the corresponding connectors located in the opening, the connectors provide a horizontal datum preventing the cover from being withdrawn from the opening.

10. The cover of claim 8 wherein the cover further comprises a plurality of standoff ribs extending substantially orthogonally from the underside of the cover, wherein the standoff ribs are configured to rest on a standoff shelf positioned in the opening of the vehicle instrument panel such that, when the cover is properly seated in the opening of the vehicle instrument panel, the standoff ribs resting on the standoff shelf provide a horizontal datum preventing the cover from being further inserted into the opening.

11. The cover of claim 8 wherein the at least one lock-out rib and the plurality of connectors are integral with the cover.

12. The cover of claim 8 wherein the cover, the at least one lock-out rib and the plurality of connectors comprise a polymeric material and are injection molded as a single piece.

13. The cover of claim 8 wherein at least a portion of the top surface comprises a grid pattern.

14. A method of preventing a cover from being improperly installed in an opening of a vehicle instrument panel containing an accessory comprising:
   providing a vehicle instrument panel having at least one opening for receiving an accessory;
   providing a cover comprising a top surface, an underside and at least one lock-out rib, wherein the at least one lock-out rib extends from the underside of the cover;
   positioning the cover in the opening of the vehicle instrument panel;
   exerting a force on the cover to seat the cover in the opening wherein, when an accessory is located in the opening of the vehicle instrument panel, the at least one lock-out rib on the underside of the cover contacts the accessory preventing the cover from being seated in the opening and thereby preventing the cover from being improperly installed in the opening of the vehicle instrument panel.

15. The method of claim 14 wherein the cover further comprises a plurality of connectors configured to secure the cover in the opening of the instrument panel, wherein the plurality of connectors extend substantially orthogonally from the underside of the cover; and
   wherein, when the cover is positioned in the opening of the vehicle instrument panel and the opening comprises an accessory, the at least one lock-out rib contacts the accessory and prevents the plurality of connectors from securing the cover in the opening of the instrument panel.

16. The method of claim 15 wherein, when the plurality of connectors of the cover are engaged with corresponding connectors located in the opening, the connectors provide a horizontal datum preventing the cover from being withdrawn from the opening.

17. The method of claim 15 wherein the cover further comprises a plurality of standoff ribs extending substantially orthogonally from the underside of the cover, wherein the standoff ribs are configured to rest on a standoff shelf positioned in the opening of the vehicle instrument panel such that, when the cover is properly seated in the opening of the vehicle instrument panel, the standoff ribs resting on the standoff shelf provide a horizontal datum preventing the cover from being further inserted into the opening.

18. The method of claim 15 wherein the at least one lock-out rib and the plurality of connectors are integral with the cover.

19. The method of claim 14 wherein the cover and the at least one lock-out rib comprise a polymeric material and are injection molded as a single piece.

20. The cover of claim 14 wherein at least a portion of the top surface of the cover comprises a grid pattern.

* * * * *